M. V. RUFF.
AUTOMATIC AIR CUSHION AND SHOCK ABSORBER.
APPLICATION FILED DEC. 16, 1913.
1,103,084.
Patented July 14, 1914.
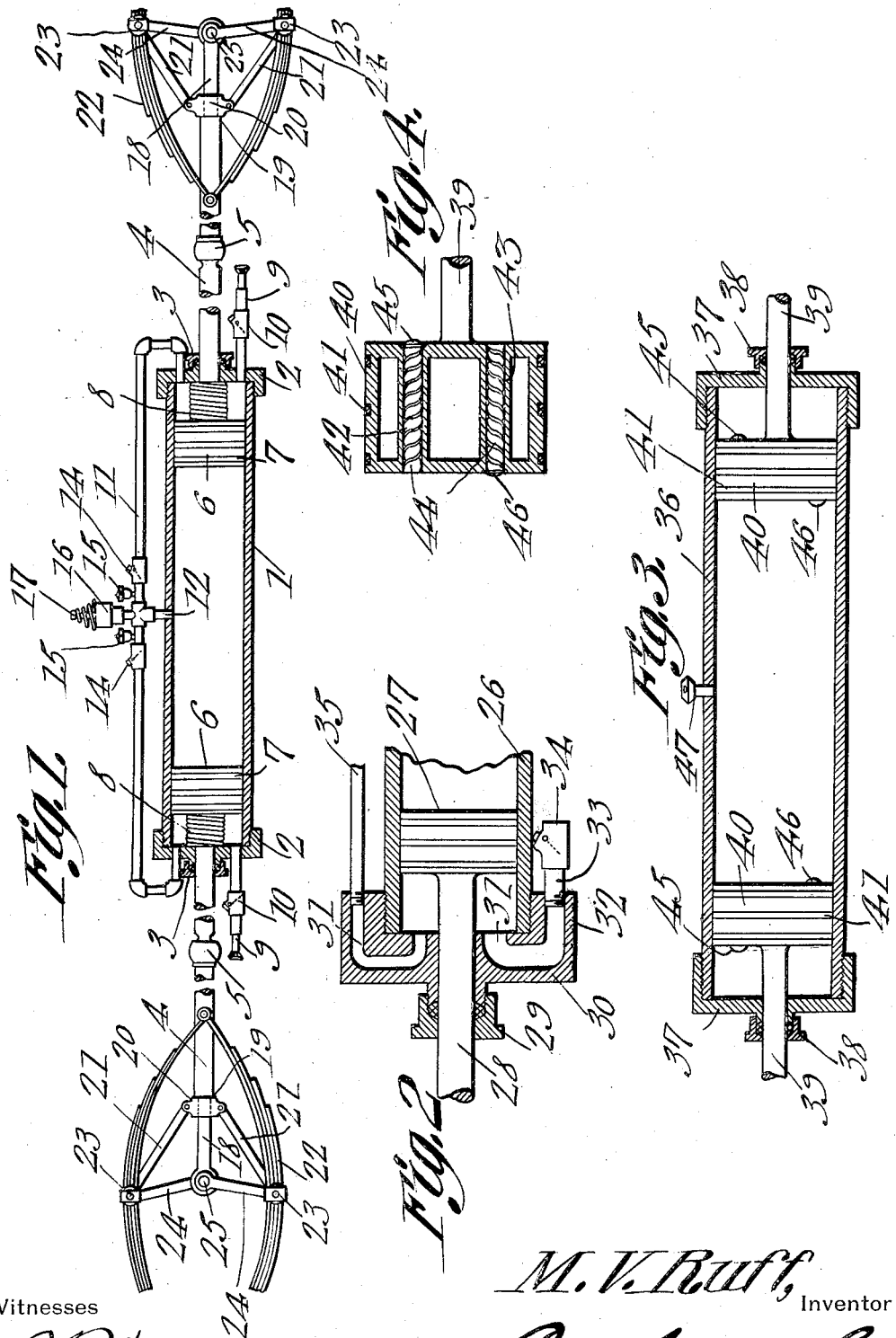
M. V. Ruff, Inventor

UNITED STATES PATENT OFFICE.

MATHEW VARNER RUFF, OF SMYRNA, GEORGIA.

AUTOMATIC AIR-CUSHION AND SHOCK-ABSORBER.

1,103,084.

Specification of Letters Patent. Patented July 14, 1914.

Application filed December 16, 1913. Serial No. 807,104.

*To all whom it may concern:*

Be it known that I, MATHEW V. RUFF, a citizen of the United States, residing at Smyrna, in the county of Cobb and State of Georgia, have invented a new and useful Automatic Air-Cushion and Shock-Absorber, of which the following is a specification.

The device forming the subject matter of this application is a shock absorber, adapted to be used upon automobiles and other vehicles, to cushion the violent vertical movement of the body portion of the vehicle when the vehicle is traversing a rough road or is passing over an obstacle. The device is of peculiar utility in preventing the breaking of springs and in rendering unnecessary, pneumatic, cushion or resilient tires upon the wheels of a vehicle.

The invention aims to provide a shock absorber, employing a fluid pressure controlled means for cushioning the movement of the vehicle body.

The invention aims to provide novel means for securing a circulation of the fluid with respect to a cylinder, and to provide novel means, operating within the cylinder, whereby the fluid pressure may be made effective as a cushioning means.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows in side elevation, one form of mechanism embodying the present invention, parts being broken away and sectioned; Fig. 2 is a fragmental longitudinal section showing a modification in the cylinder; Fig. 3 is a longitudinal section showing a modified form of the invention in which oil or some other liquid is employed as the cushioning fluid; and Fig. 4 is a longitudinal section of the piston head which is employed in that form of the invention which is depicted in Fig. 3.

In carrying out the invention and referring particularly to Fig. 1, there is provided a cylinder 1 having heads 2 carrying packing glands 3 receiving for sliding movement piston rods 4. The piston rods 4 are two-part structures, and the constituent elements of the piston rods may be united by a joint 5. This joint 5 may be a ball and socket joint, as shown, or any other form of joint may be employed when desired. Obviously, the function of the joint 5, is to prevent a lateral strain upon the piston rods 4. Operating within the cylinder 1 and connected with the piston rods 4 are heads 6 surrounded by packing rings 7. Compression springs 8 are attached to the inner faces of the heads 2 of the cylinder 1 and are adapted to receive the piston heads 6, when the same move in opposite directions, the function of the springs 8 being to prevent the piston heads 6 from knocking against the cylinder heads 2.

Mounted in each of the cylinder heads 2 is an air intake pipe 9 in which is interposed a check valve 10. The check valves 10 close toward the outer ends of the air intake pipes 9, and the construction, therefore, is such that although air may pass into the cylinder 1 through the intake pipes 9, air will not be forced outwardly through the intake pipes when the piston heads 6 move toward the ends of the cylinder 1.

The invention includes a pipe 11 forming a communication between the end portions of the cylinder 1, and, more specifically, forming a communication between spaces defined by the piston heads 6 and the cylinder heads 2. The pipe 11 is shown as of looped form, its ends passing inwardly through the cylinder heads 2. The intermediate portion of the pipe 11 is united by means of a connection 12 by the central portion of the cylinder 1. Interposed in the pipe 11 and located upon opposite sides of the connection 12 are check valves 14. The check valves 14 close toward the ends of the cylinder 1, the construction being such that air can be forced through the pipe 11 and through the connection 12 into the cylinder 1, it being impossible, however, for the air to flow backwardly through the connection 12 and through the pipe 11 when the piston heads 6 approach each other. A safety valve 16 may be interposed in the pipe 11 and any suitable means indicated at 17 may be employed for regulating the pop-off point of the valve 16.

The outer ends of the jointed piston rods 4 are reduced in diameter to form spindles 18, the spindles 18 defining shoulders 19 in the piston rods. Mounted to slide upon the spindles 18 are cross heads 20, connected pivotally with diverging links 21. The vehicle springs are indicated at 22 and the upper and lower portions of the vehicle springs carry clamps 23 with which the ends of the links 21 are pivotally connected. Other links 24 are pivotally connected with the clamps 23, the inner ends of the links 24 being pivotally connected as indicated at 25 with each other and with the ends of the spindles 18. The links 24 stand in approximately vertical positions when the piston heads 6 are adjacent the ends of the cylinder 1, and are disposed at a large, obtuse angle with respect to each other. The links 21 stand at an acute angle to each other under the circumstances above pointed out.

In practical operation, when the vehicle passes over an obstruction, the springs 22 are compressed and the links 24 knuckle toward each other, thereby forcing the piston rods 4 inwardly, the spindles 18 of the piston rods sliding in the cross heads 20. Owing to the fact that the links 24 are normally disposed approximately in alinement, as shown in Fig. 1, the throw of each piston rod is increased. The function of the links 21 is to prevent the links 24 from standing quite in alinement, thereby effecting a dead center, it being obvious that when the shoulder 19 engages the cross head 20 upon the outward movement of the piston rod 4, the parts will be positioned as shown in Fig. 1 of the drawings.

When the rods 4 move inwardly, due to the compression of the spring 22, the piston heads 6 move toward each other, and air is drawn into the ends of the cylinder 1 through the intake pipes 9. When the piston heads 6 move away from each other, as the springs 22 expand, the air will be forced through the pipe 11 and will enter the cylinder 1 by way of the connection 12. Thus air is trapped in the cylinder 1 between the piston heads 6 and upon the next reciprocation of the vehicle body vertically, the air which is trapped between the piston heads 6 will act as a cushion. Any undue pressure within the cylinder 1 is relieved by means of the safety valve 16.

That form of the invention which is depicted in Fig. 2 needs no extended description, since the operation thereof is identical with that form of the invention which is shown in Fig. 1, parts described in Fig. 1 and not described in Fig. 2, being employed. That form of invention which is shown in Fig. 2 is of utility, principally due to the fact that it gives more room in the cylinder head for the piston rod.

In Fig. 2 the cylinder is denoted by the numeral 26 and the piston head is denoted by the numeral 27, the piston rod being shown at 28 and the gland at 29. The cylinder head 30 is provided with passages 31 which are prolonged into the flange 32 of the head 30. Into the mouth of one passage 31 is inserted the intake pipe 33 carrying the check valve 34 as above described. In the mouth of the other passage 31 is inserted a pipe 35, corresponding to the pipe 11.

When the structure is to be used upon a light vehicle, oil instead of air may be employed for the cushioning fluid. Under such circumstances, the structure shown in Fig. 3 may be resorted to.

In Fig. 3, the invention is shown as comprising a cylinder 36 provided at its ends with heads 37 carrying glands 38 receiving piston rods 39, the piston heads being denoted by the numeral 40. The piston heads 40 are surrounded by packing rings 41.

As will be understood best from Fig. 4, each piston head 40 is provided with tubular passages 42 and 43 in which the spiral baffles 44 are located. At the outer end of the passage 42 is located a valve 45 preferably of the flap type and at the inner end of the passage 43 is located a similar valve 46. The cylinder 36 may be provided with a filling plug 47 and this plug, if desired, may be in the form of a safety valve. The piston rod structure and the mechanism for connecting the piston rods with the springs remains as hereinbefore described, and shown in Fig. 1.

Presupposing that there is a quantity of oil in the cylinder 36, it is to be observed that when the piston heads 40 approach each other, the valves 45 will open, permitting the oil to pass into the spaces defined by the piston heads and the cylinder heads 37. When, however, the piston heads 40 move away from each other, the oil which lies between the piston heads and the cylinder heads 37 will be forced into the space between the two piston heads 40, the valves 46 opening to permit this operation. The spiral baffles 44 serve to prevent the oil from spurting through the passages 44 and 43, and thus a retarded, cushioning action is obtained.

It will be understood that in practice, two of the structures shown in Fig. 1 are employed, one structure being located upon one side of the vehicle, and the other structure being located upon the other side of the vehicle.

At all points where friction is encountered ball bearings or other suitable anti-friction means may be provided. In the drawings, the anti-friction means above referred to have not been shown, since the use of anti-friction devices wherever necessary, lends no novelty to a structure, unless the anti-friction device, itself, is of a novel and improved form.

Having thus described the invention, what is claimed is:—

1. In a device for cushioning the movement of a vehicle body; a cylinder; piston structures operating in the cylinder; primary links pivoted to the ends of the piston structures; cross heads slidable upon the piston structures; means for limiting the movement of the cross heads; and secondary links connecting the cross heads with the primary links.

2. In a device for cushioning the movement of a vehicle body; a cylinder; a piston structure operating in the cylinder; primary links pivoted to the ends of the piston structure; a cross head slidable upon the piston structure; means for limiting the movement of the cross head; and a secondary link connecting the cross head with the primary link.

3. In a device for cushioning the movement of a vehicle body, a cylinder; piston structures operating therein; and a conduit opening into the cylinder between the ends of the cylinder and the piston structures, the conduit including a branch which opens into the cylinder between the piston structures.

4. In a device for cushioning the movement of a vehicle body, a cylinder; piston structures operating therein; a conduit opening into the cylinder between the ends of the cylinder and the piston structures, the conduit including a branch which opens into the cylinder between the piston structures; and a safety valve communicating with the space between the piston structures.

5. In a device for cushioning the movement of a vehicle body, a cylinder; piston structures operating therein; a conduit opening into the cylinder between the ends of the cylinder and the piston structures, the conduit including a branch which opens into the cylinder between the piston structures; check valves in the conduit upon opposite sides of the branch; inlets at the ends of the cylinder; and check valves controlling the inlets.

6. In a device for cushioning the movement of the vehicle body, a cylinder; piston structures operating therein; a conduit opening into the cylinder between the ends of the cylinder and the piston structures, the conduit including a branch which opens into the cylinder between the piston structures; check valves in the conduit upon opposite sides of the branch; inlets at the ends of the cylinder; check valves controlling the inlets; and a safety valve communicating with the conduit between the check valves of the conduit.

In testimony that I claim the foregoing as my own, I have hereto affixed my signature in the presence of two witnesses.

MATHEW VARNER RUFF.

Witnesses:
S. J. IULAN,
J. S. BELL.